(12) United States Patent
Ducarne et al.

(10) Patent No.: US 12,296,937 B2
(45) Date of Patent: May 13, 2025

(54) PROPULSION WING OF A MOVING VEHICLE, AND MOVING VEHICLE COMPRISING SUCH A PROPULSION WING

(71) Applicant: CWS MOREL, Saint-Maur-des-Fosses (FR)

(72) Inventors: Julien Ducarne, Saint-Maur-des-Fosses (FR); Julien Morel, Saint-Maur-des-Fosses (FR)

(73) Assignee: CWS MOREL, Paris (FR)

( * ) Notice: Subject to any disclaimer, the term of this patent is extended or adjusted under 35 U.S.C. 154(b) by 375 days.

(21) Appl. No.: 17/780,767

(22) PCT Filed: Sep. 28, 2020

(86) PCT No.: PCT/EP2020/077032
§ 371 (c)(1),
(2) Date: May 27, 2022

(87) PCT Pub. No.: WO2021/104715
PCT Pub. Date: Jun. 3, 2021

(65) Prior Publication Data
US 2022/0411032 A1  Dec. 29, 2022

(30) Foreign Application Priority Data
Nov. 28, 2019 (FR) ...................... 1913358

(51) Int. Cl.
*B63H 9/061* (2020.01)
(52) U.S. Cl.
CPC ................... *B63H 9/0628* (2020.02)

(58) Field of Classification Search
CPC ... B63H 9/00; B63H 9/04; B63H 9/06; B63H 9/061; B63H 9/067; B63H 9/0621;
(Continued)

(56) References Cited

U.S. PATENT DOCUMENTS 3,934,533 A    1/1976  Wainwright
10,232,912 B1 *  3/2019  Kunstadt .............. B63H 9/061
(Continued)

FOREIGN PATENT DOCUMENTS

WO    2013/070070 A1    5/2013
WO    2015/193617 A1    12/2015
(Continued)

OTHER PUBLICATIONS

Nov. 9, 2020 International Search Report issued in International Patent Application No. PCT/EP2020/077032.

*Primary Examiner* — Daniel V Venne
(74) *Attorney, Agent, or Firm* — Oliff PLC

(57) ABSTRACT

A rigid propulsion wing for a moving vehicle, including at least one first section and one second section, a first end and a second end each including attachment means for reversibly connecting to said moving vehicle, said first section and said second section being movable with respect to each other by means of articulating means such that said propulsion wing assumes, and moves from, at least a first deployed position to a second deployed position, and vice versa, in which deployed positions said first and second sections are arranged, substantially vertically, in the extension of each other, and in which said first end, or respectively said second end, are reversibly connected to said moving vehicle by means of the attachment means thereof.

28 Claims, 9 Drawing Sheets

(58) Field of Classification Search
CPC ... B63H 9/0628; B63B 15/00; B63B 15/0083; B63B 2015/0016; B63B 35/00; B63B 2035/009; Y02T 70/5236
USPC .............. 114/102.1, 102.13, 102.16, 102.27, 114/102.29, 108
See application file for complete search history.

(56) References Cited

U.S. PATENT DOCUMENTS

| | | | |
|---|---|---|---|
| 2015/0000578 | A1 | 1/2015 | Strebe et al. |
| 2017/0369139 | A1* | 12/2017 | Arendts ................. B63H 9/067 |
| 2018/0208287 | A1* | 7/2018 | Zenoz ..................... B63H 9/08 |

FOREIGN PATENT DOCUMENTS

| | | | |
|---|---|---|---|
| WO | 2017/006315 | A1 | 1/2017 |
| WO | 2019/092533 | A1 | 5/2019 |

* cited by examiner

PROPULSION WING OF A MOVING VEHICLE, AND MOVING VEHICLE COMPRISING SUCH A PROPULSION WING

SUBJECT MATTER OF THE INVENTION

The present invention relates to a propulsion wing of a moving vehicle, on land, ice or water, in particular a wind-based propulsion wing, and to a moving vehicle, for example a boat, comprising or implementing such a propulsion wing.

BACKGROUND OF THE INVENTION

Moving vehicles, for moving people or goods, are generally set in motion by propulsion means, which conventionally implement a driving force, for example originating from an engine, or from the force of the wind.

In particular for boats, irrespective of whether they are motorized, it is known to use flexible sails as primary propulsion means, the driving force being generated by the action of the wind in the sails.

Such flexible sails, which deform continuously under the effect of the wind, have the drawback of having a quite variable propulsion efficiency, and the drawback of generating significant drag forces oriented toward the rear of the moving vehicle.

The use of rigid sails has then been proposed, also called "propulsion wings," allowing the generation of greater lift than a flexible sail as well as less drag.

Such propulsion wings can have a so-called "symmetrical" aerodynamic profile, the camber of the sides of the wings being symmetrical with respect to the central and vertical plane of the wing.

For example, document WO2013070070 describes a rigid wing for a boat, which comprises a mast comprising a foot secured to the boat, but which can rotate about an axis of rotation that is substantially vertical relative to the boat, in order to adjust the angle of attack of the wind. The wing can be wind-bound, so as to take up less space during docking or mooring, due to the fact that the mast is only secured to the lower portion of the wing, two other upper sections of the wing being able to fold by tilting. Such a wing has much lower aerodynamic performance than that of an asymmetrical wing.

However, symmetrical profile propulsion wings generate less lift than a so-called "asymmetrical" profile wing, that is to say, which has a convex, or cambered, first face, and a flat, or concave, second face. Nevertheless, an asymmetrical wing has the drawback of not being able to be used irrespective of the direction of the wind.

It has then been proposed, as described in document US2015000578, to arrange two rigid asymmetrical propulsion wings on either side of the vessel, mounted on an A-shaped mast; this solution has the drawback of being bulky and not easy to implement.

Document WO2017006315 in turn describes a rigid asymmetrical wing, mounted pivoting on the upper end of a mast, along a tilting axis located substantially in the middle of the wing, the lower part of the mast being mounted on a base, which in turn is mounted pivoting on the boat. Such a wing has the drawback of greatly destabilizing the boat, which then bears changes of sides.

Furthermore, it has also been proposed to use a rigid propulsion wing that is deformable, using an articulated inner profile structure, allowing the propulsion wing to go from a first asymmetrical profile to a second asymmetrical profile, by way of a symmetrical profile, as described for example in document WO2015193617.

Nevertheless, all of these propulsion wings have the drawback of being complex to implement and of not being suitable or adaptable for all wind conditions.

AIMS OF THE INVENTION

The present invention aims to provide a rigid propulsion wing and a moving vehicle that do not have the drawbacks of the state of the art.

The present invention aims to provide an alternative to the existing solutions of the state of the art.

The present invention aims to provide a rigid propulsion wing that is capable of adapting to different wind conditions.

The present invention aims to provide an asymmetrical rigid propulsion wing having an improved propulsion efficiency and that is usable irrespective of the direction of the wind.

The present invention also aims to provide a rigid wing that does not comprise a mast, and that is capable of varying its height quickly and easily.

The present invention also aims to provide a rigid wing whose feathering minimizes the generated forces, and is done passively.

BRIEF DESCRIPTION OF THE INVENTION

The present invention relates to a rigid propulsion wing for a moving vehicle, comprising at least one first section and one second section, a first end formed by one of the ends of the first section and a second end formed by one of the ends of the second section, the ends of the propulsion wing each comprising attachment means for reversibly connecting to the moving vehicle, the first section and the second section being movable with respect to each other by means of articulating means such that the propulsion wing assumes, and moves from, at least a first deployed position to a second deployed position, and vice versa, in which deployed positions the first section and the second section are arranged, substantially vertically, in the extension of each other, and in which the first end, or respectively the second end, are reversibly connected to the moving vehicle by means of the attachment means thereof.

According to preferred embodiments of the invention, the propulsion wing according to the invention comprises at least one, or any suitable combination, of the following features:

- the propulsion wing further comprises an intermediate section, arranged between, and movable with respect to, the first section and the second section, using articulating means,
- the first section, the second section, and the intermediate section if it is present, are movable with respect to one another using articulating means so that the propulsion wing assumes, and moves through, an intermediate position between the first and the second deployed position, in which the first section and the second section are arranged, substantially parallel to each other, on either side of a substantially vertical plane of symmetry, and in which the first end and the second end are both connected, reversibly, to the moving vehicle, using the attachment means thereof,
- the first section, the second section, and optionally the intermediate section if it is present, have an asymmetrical aerodynamic profile, the articulating means comprise a connecting rod engaging the movable rod of two cylinders respectively attached to the first section and the second section, the propulsion wing further comprises locking means of the articulating means, the propulsion wing further comprises means for actuating the articulating means to set the sections of the propulsion wing in motion, comprising a set of pulleys on which a ballasted cable travels, each end of which is connected to a winch, the propulsion wing further comprises at least one base, movable relative to the moving vehicle, and comprising first means and second means for respectively receiving the attachment means of the first end and the attachment means of the second end of the propulsion wing, the attachment means of the first end and the attachment means of the second end each comprise an attachment plate provided with two grooves, the first means and the second means for receiving the attachment means comprise two studs, attached to the base and intended to engage, and during operation, engaging, the grooves, the propulsion wing further comprises or cooperates with first and second locking means for blocking the attachment means of the first end and the second end, respectively, said locking means each comprising a spring-loaded actuator, the propulsion wing further comprises or cooperates with means prohibiting the simultaneous opening of the first and second locking means, the propulsion wing further comprises a center board arranged under one of the sections of the propulsion wing and/or one or several fins arranged at the first end and/or the second end, the propulsion wing further comprises or cooperates with control means of the articulating means and/or control means of means for controlling the incidence of the propulsion wing relative to the direction of the wind.

The present invention also relates to the use of the propulsion wing according to the invention for the primary, or backup, propulsion of a moving vehicle.

The present invention also relates to a moving vehicle, whether maritime or land-based, comprising one or several propulsion wings according to the invention.

DETAILED DESCRIPTION OF THE INVENTION

Figure 1:
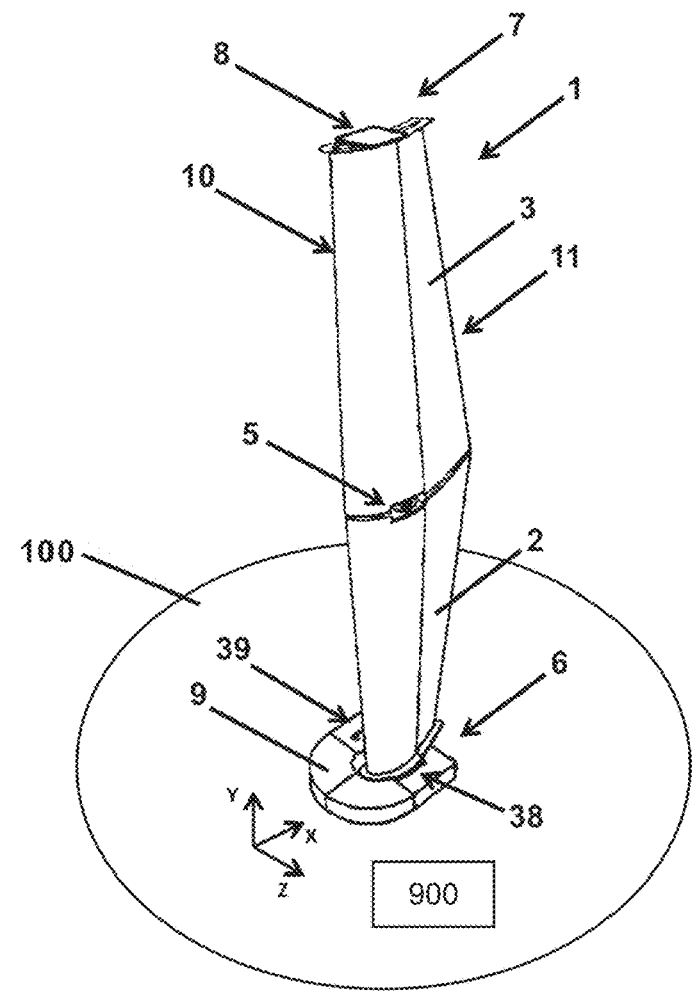
FIG. 1 is a schematic illustration of a perspective view of a first embodiment of the propulsion wing according to the invention, having adopted a first deployed position.

In the remainder of the description and the claims, the term "length" is used to describe the largest of the measurements of the propulsion wing 1 according to the invention, or of its component elements, and the term "width" is used to describe the smallest of the measurements of the propulsion wing 1 according to the invention, or of its component elements, irrespective of their geometric shape, the terms "length" and "width" being able to be used indifferently if the propulsion wing 1 according to the invention, or its component elements, have a substantially square shape.

The terms "top," "bottom," "upper," "lower," "front," "rear," "vertical" or "horizontal" refer to the horizontal position of the propulsion wing 1 according to the invention, and its component elements, as shown in FIGS. 1 to 18.

The propulsion wing 1 according to the invention is a wind-based propulsion wing, allowing the movement of the vehicle that bears it, owing to the force of the wind. It is not a wing for causing the vehicle to take off, so that it no longer touches the ground or the surface of the water.

The propulsion wing 1 is rigid, and it is said to be "self-supporting," since it does not deform substantially under the action of the wind and does not bend under its own weight.

The propulsion wing 1 is said to be "sectional," since it comprises, or is made up of, at least one first section 2 and one second section 3 (FIGS. 1 to 4), preferably also an intermediate section 4, arranged between the first section 2 and the second section 3 (FIGS. 8 to 12), advantageously a multitude of sections, the sections being movable relative to each other using articulating means 5.

The sections 2, 3, and the intermediate section 4 if it is present, form a structural unit. This has the advantage of not requiring the use of an unmovable and supporting structure, of the mast type.

Preferably, the sections 2, 3 and 4 comprise, or are made up of, a hollow enclosure comprising, or made from, a ribbed metallic skin or a composite material, the enclosure optionally being able to comprise an inner reinforcing structure, which has the advantage of having a wing with a contained weight.

Preferably, one, the other or all of the sections 2, 3 and 4 are telescoping.

The propulsion wing 1 comprises a first end 6, formed by one of the ends of the first section 2, and a second end 7, formed by one of the ends of the second section 3. Each of the ends 6 and 7 of the propulsion wing 1 comprises means 8 for reversible attachment to the moving vehicle 100 preferably by means of one or several bases 9, which is or are connected to the moving vehicle 100 preferably movably, advantageously a base 9 by ends 6, 7 of the propulsion wing 1.

The propulsion wing 1 can adopt a first deployed position (FIG. 1, 8, 12, 17), so as to pick up the wind on one of the sides of the moving vehicle 100 and to have optimal lift, to move to, and adopt, a second deployed position (FIG. 12), symmetrical to the first deployed position, along a plane of symmetry in the plane X-Y, so as to pick up the wind on the other side of the moving vehicle 100, also with optimal lift, and vice versa, the propulsion wing being able to move from the second deployed position to its first deployed position, while being able to adopt all of the intermediate positions between the first or the second deployed position, each extreme or intermediate position preferably being lockable and unlockable. The propulsion wing 1 thus has the advantage of being able to be used irrespective of the direction of the wind.

In these deployed positions, the first section 2, the second section 3, and optionally the intermediate section 4 if it is present, are arranged substantially in the extension of each other, substantially vertically, along an axis substantially parallel to the axis Y, the propulsion wing 1 being attached to the moving vehicle 100, preferably by means of the base 9, by its first end 6 in the first deployed position, and by its second end 7, in the second deployed position.

In the first deployed position, the first section 2 is a lower section of the propulsion wing 1, close to the vehicle 100, or of the base 9, and the lower end of which is attached to the vehicle 100, or to the base 9, its upper end being connected to the second section 3, which constitutes the upper section of the wing 1, which is not attached to the moving vehicle 100 or to the base 9.

In the second deployed position, the second section 3 is the lower section of the propulsion wing 1, one of the ends of which is attached to the moving vehicle 100 or to the base 9, whereas the first section 2 constitutes the upper section of the wing, a section not attached to the moving vehicle 100 or to the base 9.

When it moves from one deployed position to the other deployed position, the propulsion wing 1 has tilted relative to a plane substantially parallel to the plane X-Y, by an angle of 180°. Thus, the ends 6 and 7 alternately form the top and the bottom of the propulsion wing 1.

In the embodiment in which the sections 2, 3, and optionally the intermediate section 4, are telescoping, they can comprise, or be made up of, two walls articulated along their aerodynamic profile so as to be able to fold two, one of the two walls on the other, against the moving vehicle 100, the walls of the upper section(s) folding onto the walls of the section below them, which has the advantage of having a propulsion wing 1 that can move from one of the deployed positions to a wind-bound position in which the propulsion wing 1 has a reduced space requirement.

In these deployed positions, the propulsion wing 1, and therefore its component sections 2, 3 and 4, have an asymmetrical general aerodynamic profile, which can be variable over the length of the propulsion wing 1. Preferably, the first section 2 and the second section 3 are symmetrical to one another relative to a plane of symmetry parallel to the plane X-Z (FIG. 8), but they can also have a different aerodynamic profile from each other (FIG. 17), while imparting an asymmetrical general aerodynamic profile to the propulsion wing 1.

Figure 2:
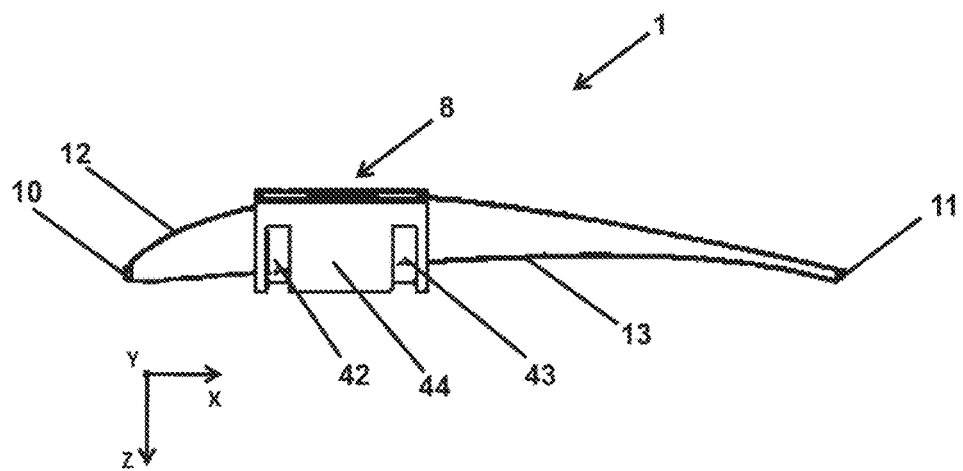
FIG. 2 is a schematic illustration of a bottom view of the propulsion wing according to the invention.

The propulsion wing 1 comprises a leading edge 10, a trailing edge 11, opposite the leading edge, a convex surface 12 and a concave surface 13 (FIG. 2).

The propulsion wing 1 can also adopt a retracted position (FIG. 3, 11, 18), which is midway between the two deployed positions, that is to say, the propulsion wing 1 can adopt, and move through, this intermediate position during its transition between the two deployed positions.

In its intermediate position, the first section 2 and the second section 3 are arranged, preferably substantially parallel to each other, on either side of a vertical plane of symmetry, parallel to the plane X-Y, the propulsion wing 1 being attached to the vehicle 100, the first end 6 and the second end 7 of the propulsion wing 1 both being attached on the moving vehicle 100 or on a base 9, or each on a separate base 9.

Figure 3:
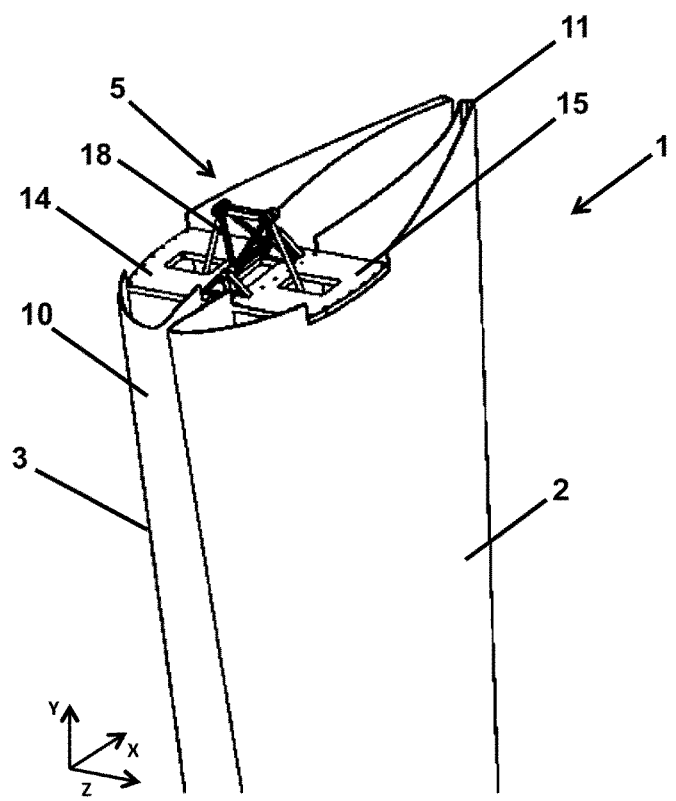
FIG. 3 is a schematic illustration of a perspective view of the propulsion wing according to the first embodiment, having adopted its retracted position.
Figure 11:
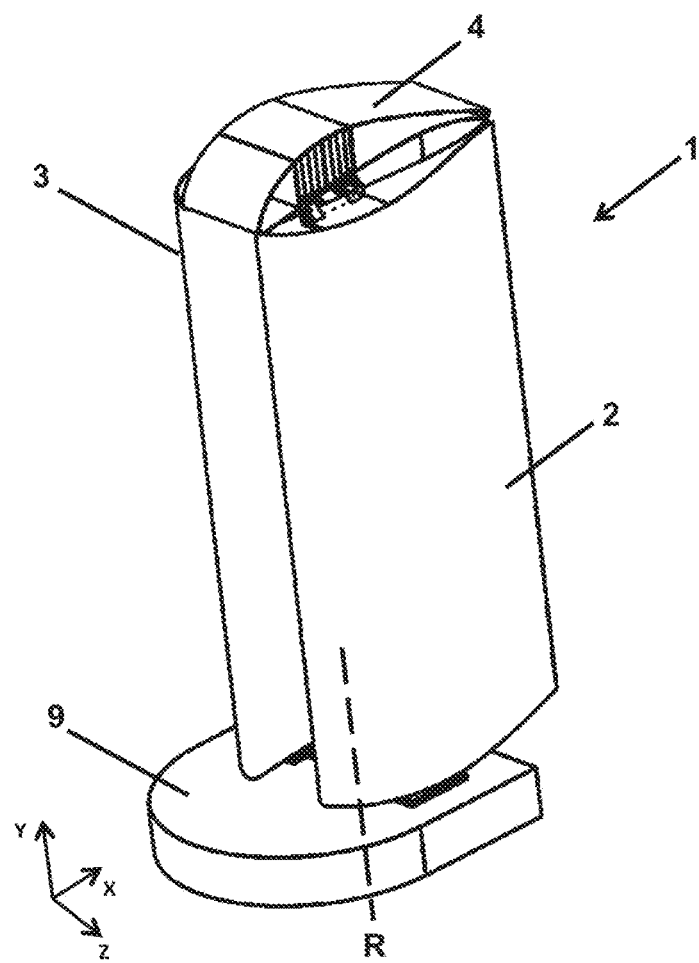
FIG. 11 is a schematic illustration of a perspective view of the propulsion wing according to the second embodiment, having adopted its retracted position.
Figure 12:
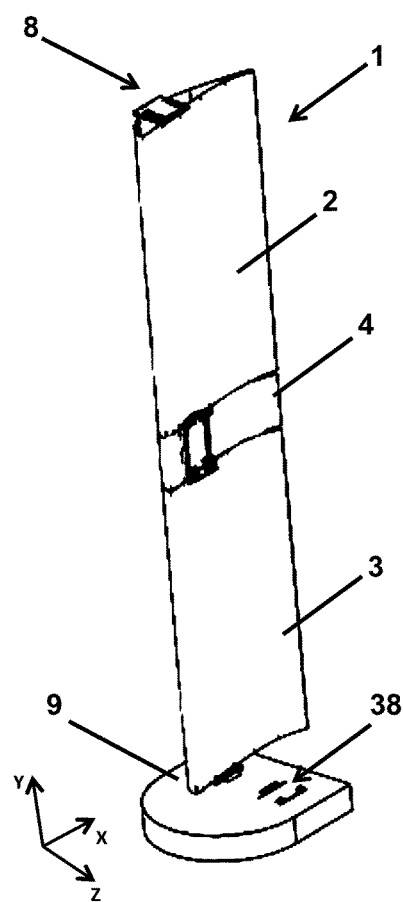
FIG. 12 is a schematic illustration of a perspective view of a second embodiment of the propulsion wing according to the invention, having adopted its second retracted position.
Figure 13:
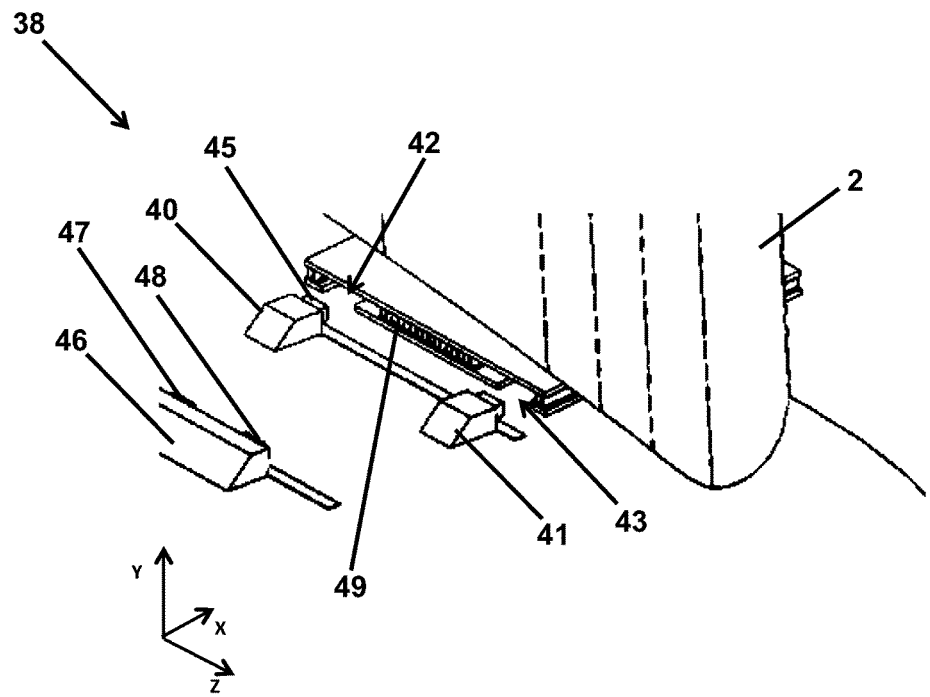
FIG. 13 is a schematic illustration of a perspective view of the locking means of the propulsion wing according to the invention on its base.
Figure 14:
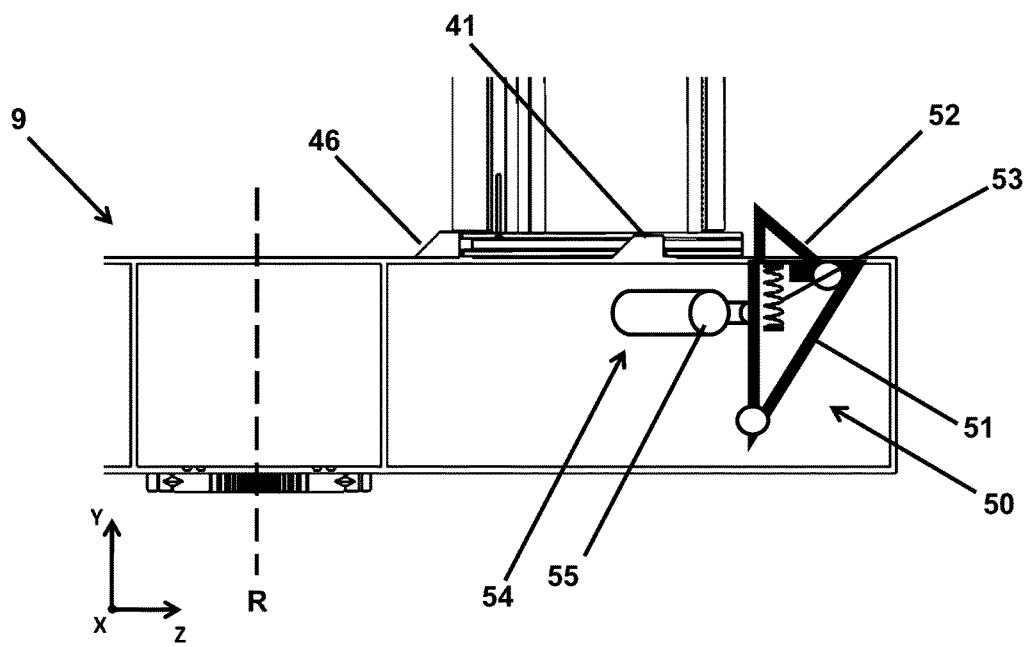
FIG. 14 is a schematic illustration of a view of the locking means of the propulsion wing according to the invention on its base, in a locked position.
Figure 15:
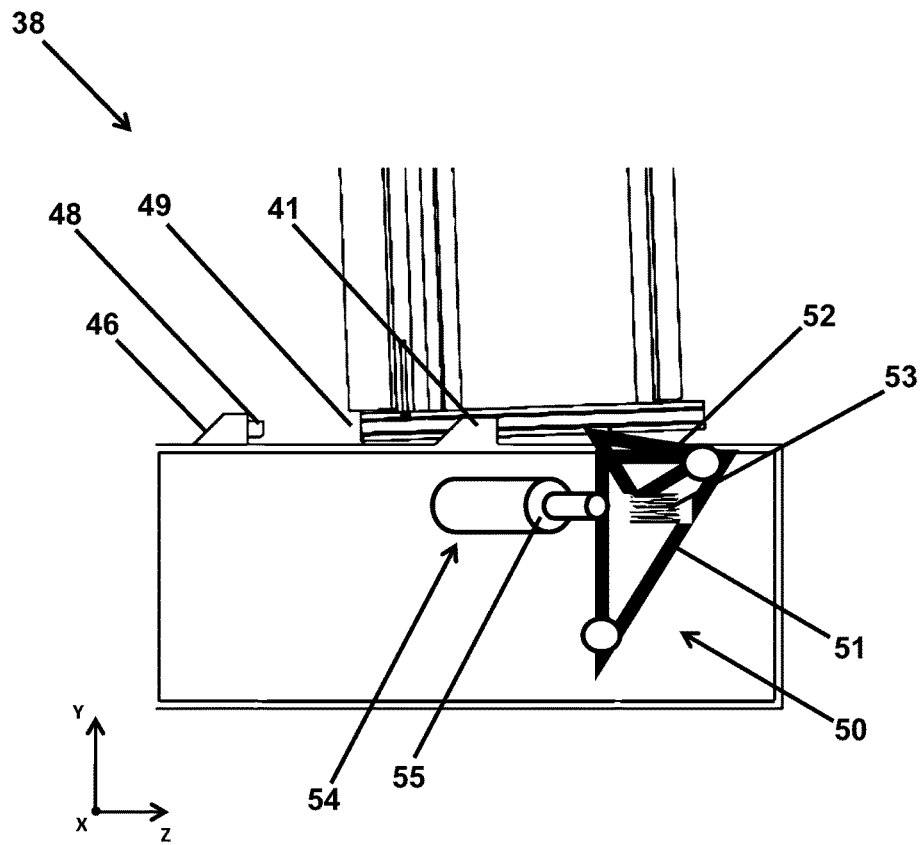
FIG. 15 is a schematic illustration of a view of the locking means of the propulsion wing according to the invention on its base, in an unlocked position.
Figure 16:
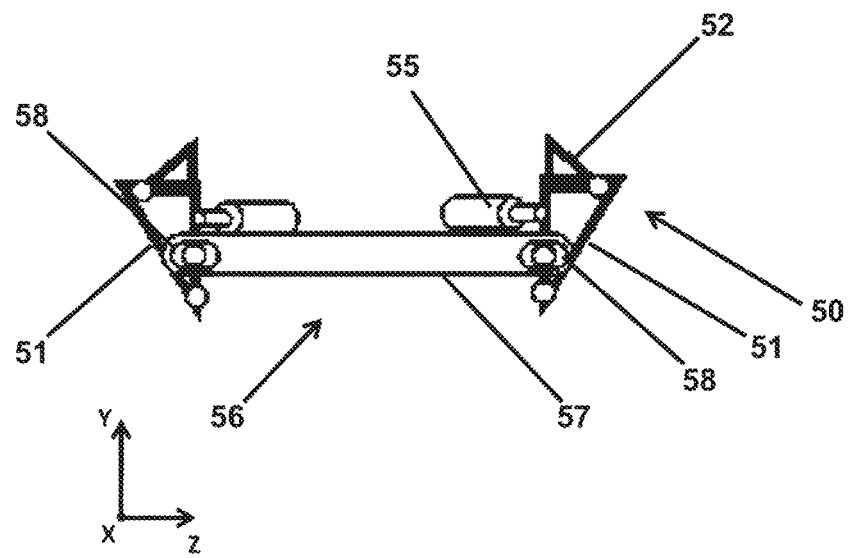
FIG. 16 is a schematic illustration of a front view of means preventing the simultaneous release of the locking means of the ends of the propulsion wing on the moving vehicle.
Figure 17:
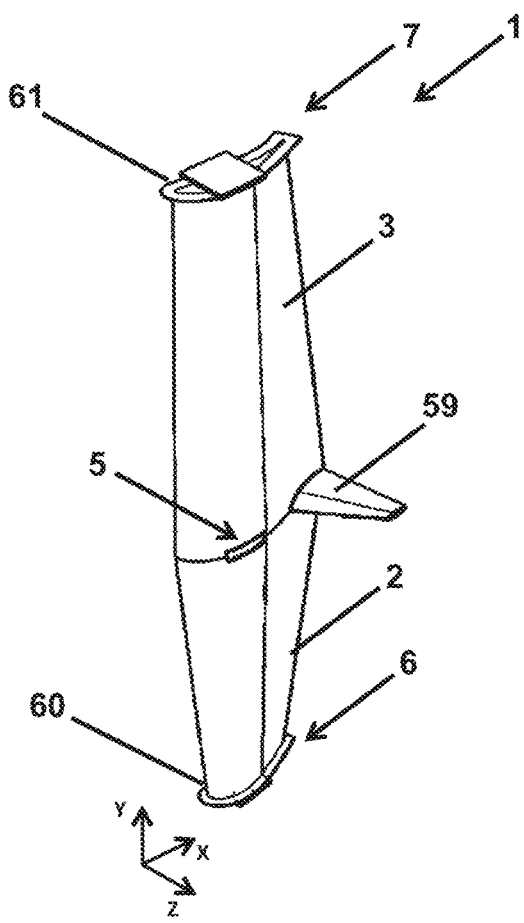
FIG. 17 is a schematic illustration of a perspective view of the propulsion wing according to the first embodiment, comprising aerodynamic stabilization means.
Figure 18:
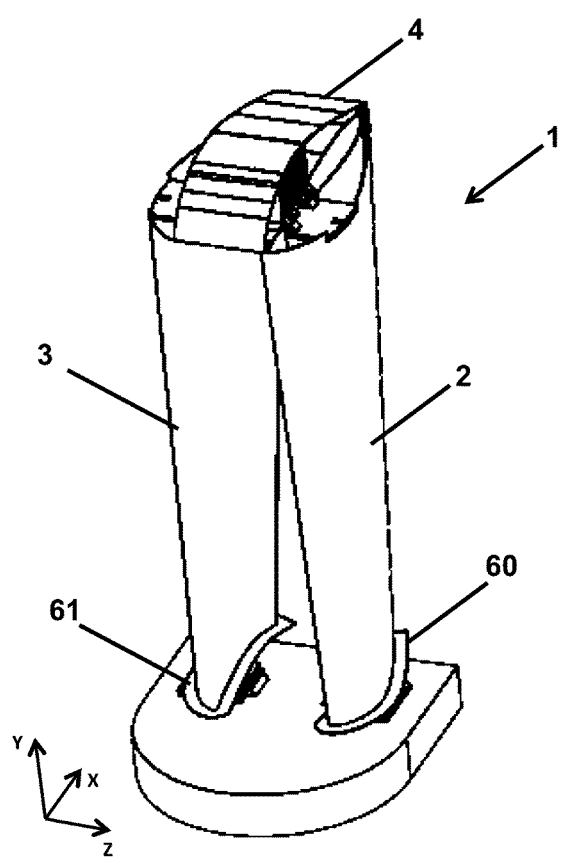
FIG. 18 is a schematic illustration of a perspective view of the second embodiment of the propulsion wing according to the invention, comprising a variable aerodynamic profile.

In the intermediate position of the propulsion wing 1, the first section 2 and the second section 3 have an asymmetrical aerodynamic profile, but, due to their arrangement, they form, and allow the propulsion wing 1 to adopt, a substantially symmetrical aerodynamic profile (FIGS. 3 and 11). Preferably, this is an aerodynamic profile that is substantially identical, or equivalent, in its general shape, to a profile of the NACA type.

The intermediate position of the propulsion wing 1 has the advantage of reducing the wind surface area, having a symmetrical aerodynamic profile with reduced lift relative to a symmetrical aerodynamic profile, and therefore greatly reducing the thrust of the propulsion wing 1, while nevertheless allowing, if necessary, generation of thrust in both directions of the wind, for maneuvering needs, for example. It allows a reduced space requirement, in particular a reduced height, and lessening of the dunnage of the moving vehicle 100.

The propulsion wing 1 thus has the advantage of being able to adapt to different wind conditions and directions, during the movement or maneuvers of the vehicle carrying it, while being able to adopt different aerodynamic profiles, and being able to move easily from one profile to another, which allows the moving vehicle 100 carrying it to have a more reactive behavior.

The passage between the different deployed positions and the retracted position of the propulsion wing 1 is done owing to the articulating means 5, which are preferably hinge-forming means.

In the embodiments in which the propulsion wing 1 is made up of two sections 2 and 3 (FIG. 1), the latter have substantially the same length so as not to destabilize the moving vehicle 100 when the propulsion wing 1 moves from one position to another. The articulating means 5 are preferably arranged at mid-length of the propulsion wing 1 and are able to pivot each of the sections 2 and 3 by a 180° angle relative to each other, and allow the propulsion wing 1 to tilt from one side to the other of the propulsion device or the base 9.

Preferably, the articulating means 5 are able to allow the rotation of the two sections 2 and 3 in a plane substantially parallel to the plane X-Z, which has the advantage of allowing the incidence of the propulsion wing 1 to be changed over its length.

Figure 4:
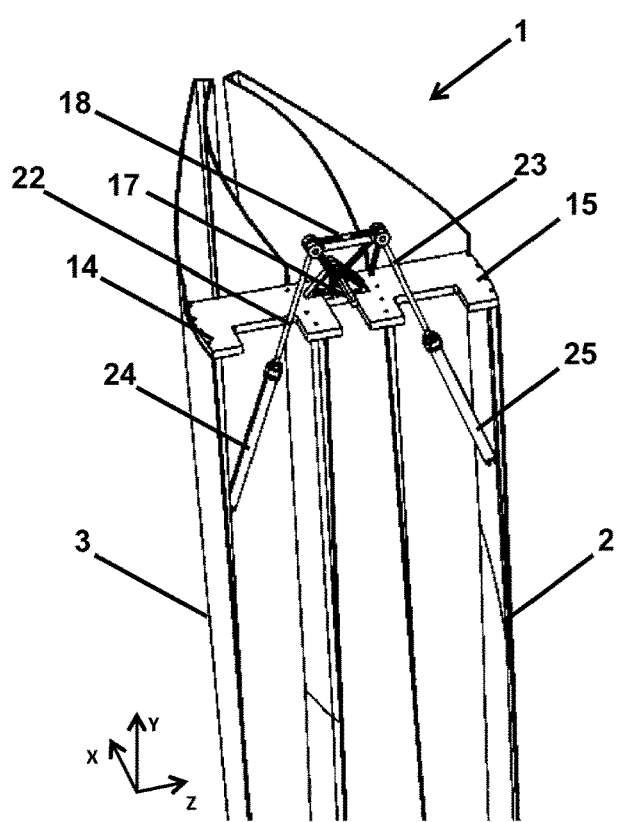
FIG. 4 is a schematic illustration of a longitudinal sectional view of the propulsion wing according to the first embodiment, having adopted its retracted position.
Figure 5:
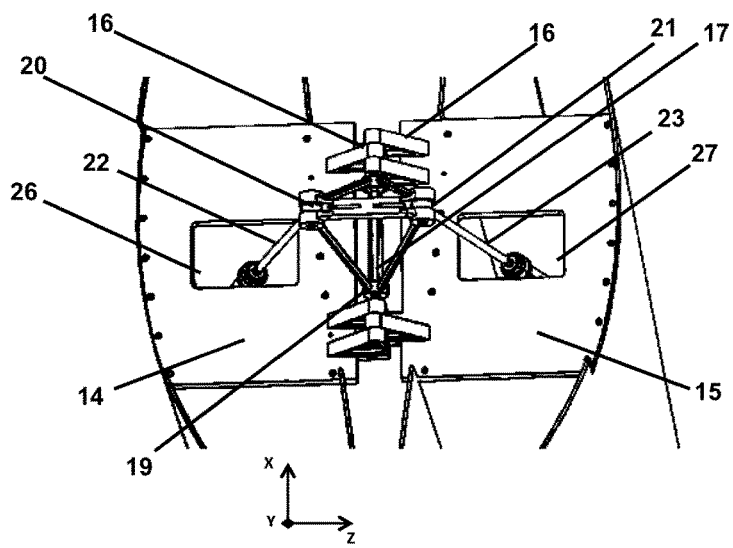
FIG. 5 is a schematic illustration of a top view of the propulsion wing according to the invention, having adopted its retracted position.

Preferably, the articulating means 5 comprise, or implement, two connecting parts 14 and 15, connected by spacers 16, arranged substantially at the center of the connecting parts 14, 15, spacers 16 receiving, and being rotatable relative to, an axis of rotation 17, the latter engaging the end of a connecting rod 18, which is preferably triangular, at a lower pivot point 19. The connecting rod 18 further comprises two upper pivot points 20 and 21, at which the ends of the movable rods 22, 23 of two cylinders 24, 25 are attached, respectively, the movable rods 22, 23 respectively passing through the openings 26, 27 formed, respectively, in each of the connecting parts 14 and 15. Each cylinder 24, 25 is attached to the inside of each section 2 and 3, at their convex side, preferably by means of a support or a frame (FIGS. 3 to 5).

Actuating one or more of the cylinders 24, 25 causes one connecting part 14 or 15 to come closer to the other connecting part 14 or 15, causing one of the sections 2 or 3 to tilt toward the other section 2 or 3, and causes their alignment.

Preferably, in these deployed positions, the propulsion wing 1 comprises or implements locking means 28 so as to lock these positions.

Figure 6:
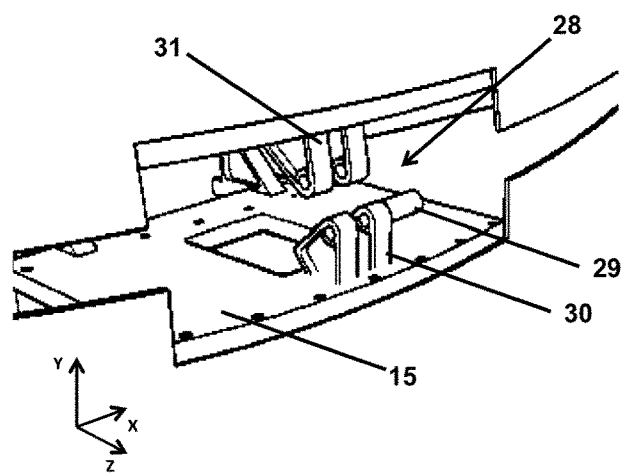
FIG. 6 is a schematic illustration of a perspective view of the locking means of the sections forming the propulsion wing according to the invention, in an unlocked form.
Figure 7:
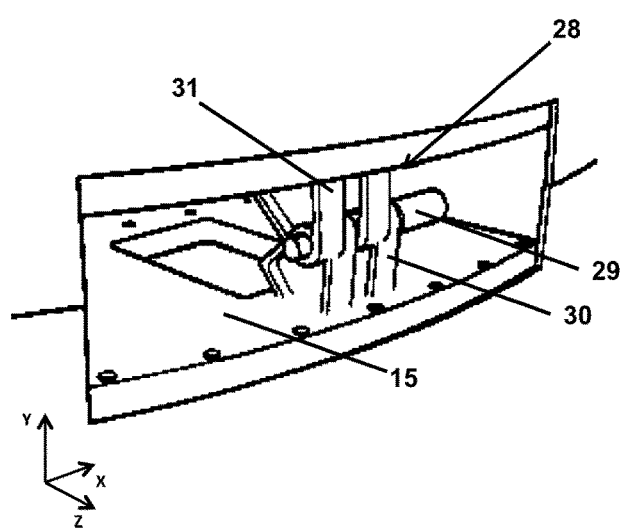
FIG. 7 is a schematic illustration of a perspective view of the locking means of the sections forming the propulsion wing according to the invention, in a locked form.
Figure 8:
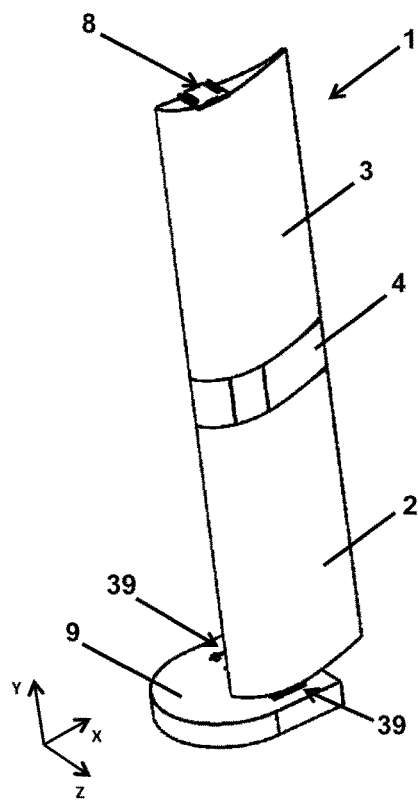
FIG. 8 is a schematic illustration of a perspective view of a second embodiment of the propulsion wing according to the invention, having adopted a first retracted position.

Preferably, as shown in FIGS. 6 and 7, these locking means 28 comprise, for example, an electromechanical or hydraulic push piece 29 engaging the orifices of one or several fastening tabs, or one or several spacers 30 and 31, respectively arranged on the end of each section 2, 3, preferably, on and at the edge of the connecting parts 14 and 15. The fastening tabs or the spacers 30 and 31 of each connecting part 14, 15 position themselves relative to each other, so as to align their orifices, and preferably are intercalated with one another (FIG. 7).

In the embodiments in which the propulsion wing 1 comprises the first section 2, the second section 3, and the intermediate section 4 (FIGS. 9 to 13), the intermediate section 4 is arranged, preferably, substantially at mid-length of the propulsion wing 1.

In the retracted position of the propulsion wing 1, the intermediate section 4 is arranged substantially horizontally, in a plane parallel to the plane X-Z.

The intermediate section 4 has an appropriate width, allowing the first section 2 and the second section 3, due to their arrangement on either side of the plane of symmetry parallel to the plane X-Y, to form, and to allow the propulsion wing 1 to adopt, a substantially symmetrical aerodynamic profile, preferably substantially identical, or equivalent, in its general shape, to a profile of the NACA type.

The articulating means 5 are arranged between the intermediate section 4 and the first section 2 on the one hand, and the second section 3 on the other hand. They are or comprise any appropriate means forming a hinge for tilting of the sections 2, 3, 4 by an angle of up to 90° relative to an axis of rotation substantially parallel to the axis X.

For example, it may be a series of yokes on the concave face of the adjacent sections 2, 3 or 4, and an axis passing in each yoke.

Figure 10:
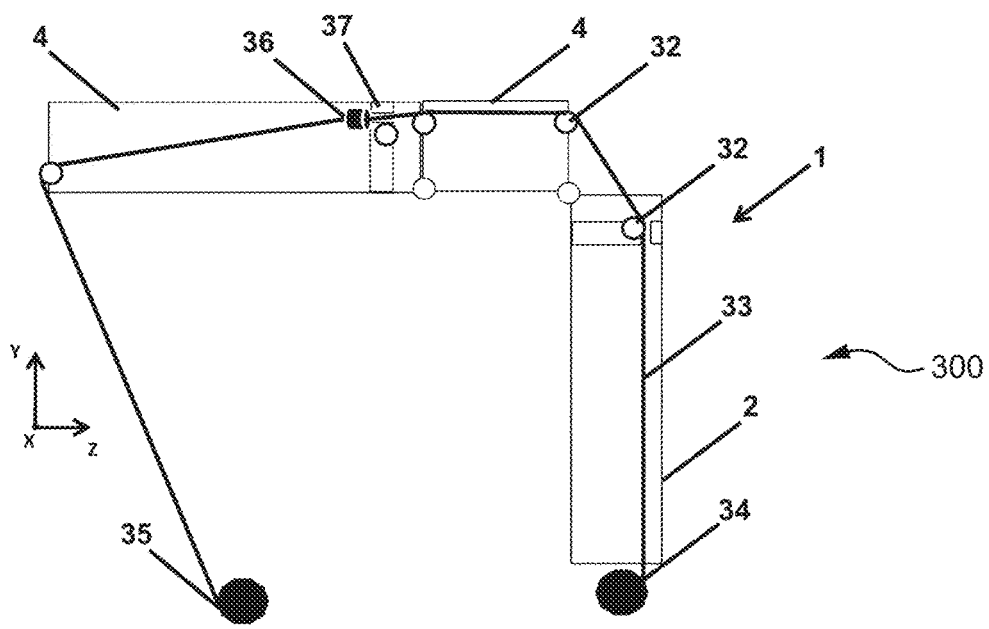
FIG. 10 is a schematic illustration of a front view of the means implemented to retract and deploy the propulsion wing according to the second embodiment.

Preferably, these articulating means 5 comprise, implement or cooperate with means for actuating 300 the movement of the sections 2, 3, 4, advantageously comprising a set of pulleys 32, or one or several hoists with three to six strands, for example, located in the intermediate section 4 receiving a cable 33, conveying, in each section 2 and 3, a cable 33 whereof a first end is connected to a first winch 34, located near, or in, the first section 2 or in the base 9, the other end of the cable 33 being connected to a second winch 35, located near, or in, the second section 3 or in the base 9. The cable 33 can be set in motion by the first and/or the second winch 34, 35. Preferably, the cable 33 is kept tensed by using one or several weights 36, for example leads, secured to the cable 33, which are advantageously arranged such that they move in the sections 2, 3 until they become jammed in a narrowing 37 formed in the cable passage 33 formed in the sections 2, 3, which allows a greater cable tension 33 to be obtained on the side of the winch 34 or 35 that winds the cable, thus allowing raising of the section 2 or 3 to be lifted (FIG. 10).

Figure 9:
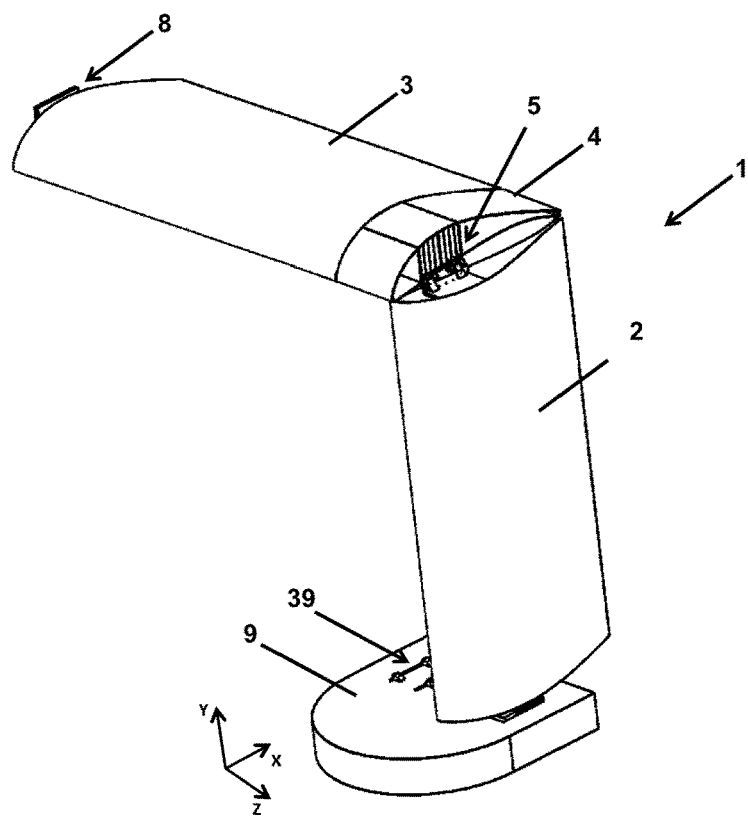
FIG. 9 is a schematic illustration of a perspective view of an intermediate position during the retraction of the propulsion wing according to the second embodiment.

In addition to the deployed positions and its retracted position, the propulsion wing 1 can adopt additional intermediate positions, such as for example that shown in FIG. 9, in which one of the sections 2 or 3 is arranged substantially vertically, whereas the other sections 2 or 3 and the intermediate section 4 are arranged in the extension of each other, substantially horizontally. This allows a reduced space requirement of the propulsion wing 1 and a wind surface that is not completely reduced or completely increased.

Irrespective of the embodiment of the propulsion wing 1, and irrespective of the position that it adopts, the propulsion wing 1 is always attached by at least one of these ends 6 and/or 7 to the moving vehicle 100, preferably to a base 9, or a base 9 by ends 6, 7.

The moving vehicle 100, the base 9 or the bases 9 to this end comprise means for reversibly receiving the attachment means 8 for attaching the propulsion wing 1 to the moving vehicle 100. These means comprise first means 38 to receive, and during operation receiving, reversibly, the attachment means 8 for attaching the first end 6 of the propulsion wing 1 (FIG. 13) and second means 39 receiving, also reversibly, the attachment means 8 for attaching the second end 7 of the propulsion wing 1, the first and second attachment means 38, 39 being arranged at a distance from each other, horizontally offset, in a plane substantially parallel to the plane X-Z.

In one particular embodiment, the first and second means 38, 39 for reversibly receiving the attachment means 8 of the propulsion wing 1 are, or comprise, a stud 40, preferably two studs 40, 41, attached by any appropriate means to the base 9, and engage in a groove 42, preferably two grooves 42, 43, respectively, formed on or in the attachment means 8 for attachment to the ends 6, 7 of the propulsion wing 1, which, preferably, are or comprise an attachment plate 44, the grooves 42, 43 extending along the lower surface of the plate 44 (FIG. 2). This has the advantage of preventing vertical and lateral movements of the sections 2 and 3 relative to the base 9 if it is present, and therefore relative to the moving vehicle 100.

Preferably, the studs 40, 41 comprise means 45 forming a stop against the bottom of the grooves 42, 43, and also optionally able to provide damping and/or to be means for disengaging the studs 40, 41 from the grooves 42, 43 against the force of a spring that is compressed when the studs 40, 41 abut at the bottom of the grooves 42, 43.

Preferably, the means 38, 39 for reversibly receiving the attachment means 8 of the propulsion wing 1 further comprise a stud 46, preferably comprising stop-forming means 47, 48, the stud 46 being attached by any appropriate means to the base 9, at an appropriate distance from the studs 40 and 41, to engage a groove 49 formed in an edge of the plate 44, when the studs 40 and 41 engage the grooves 42, 43 or when they abut at the bottom of the grooves 42, 43.

Preferably, the stop-forming means 47, 48 of the stud 46 can optionally also provide damping and/or be means for disengaging the stud 46 from the groove 49, against the force of a spring that is compressed when the stud 46 abuts at the bottom of the groove 49.

Preferably, the first and second means 38, 39 for receiving the attachment means 8 of the propulsion wing 1 comprise or cooperate with means facilitating the sliding of the attachment means 8 of the ends 6, 7, in particular of the plate 44, on the moving vehicle 100, on the base 9 or the bases 9. These means preferably comprise at least one sliding strip 62, advantageously a first sliding strip 62 arranged adjacent to the studs 40 and 41 and a second sliding strip 62 arranged adjacent to the stop-forming means 47, 48.

Preferably, the first and second means 38, 39 for receiving the attachment means 8 of the propulsion wing 1 cooperate with two series of locking means 50 of the sections 2, 3, on the propulsion device or on the base 9, one series of means 50 per section 2 and 3 of the propulsion wing 1.

These locking means 50 are, or comprise, a spring-loaded actuator 51, preferably arranged in the moving vehicle 100 or inside the base 9, comprising a blocking portion 52, for example a blade, movable on an axis substantially parallel to the axis X, and movable against the force of a spring 53, and moving from a locked position (FIG. 14) to an unlocked or partially unlocked position (FIG. 15) and vice versa, and able to adopt all of the intermediate positions between these two positions.

In the locked position, the blocking portion 52 extending vertically, along an axis substantially parallel to the axis Y, relative to, from, and beyond the upper surface of the moving vehicle 100 or the base 9, so as to block all lateral movements, along the axis substantially parallel to the axis X, from the end 6 of the first section 2, or from the end 7 of the second section 3 of the propulsion wing 1. In this position, the spring 53 is relaxed.

In one of the unlocked positions, the blocking portion 52 is not extending vertically. It extends either obliquely above the moving vehicle 100 or the base 9, or substantially horizontally so as to be flush with the upper surface of the moving vehicle 100 or the base 9, or it extends inside the moving vehicle 100 or the base 9. In these positions, the spring 53 is compressed.

Preferably, the blocking portion 52 has a cross-section, in a plane substantially parallel to the plane Y-Z, of substantially triangular shape, with an oblique wall facing the side of the propulsion vehicle by which the end 6 or 7, of the section 2 or 3, approaches the means 38, 39 for reversibly receiving the attachment means 8 of the propulsion wing 1. The end 6 or 7 comes into contact with this oblique wall and causes the rotation of the blocking portion 52, which compresses the spring 53 so that it lies down substantially horizontally so as, once the end 6 or 7 has passed it, to rise up automatically owing to the release of the spring 53, to thus block the end 6 or 7 in the means 38, 39 for reversibly receiving the attachment means 8 of the propulsion wing 1.

Preferably, the two series of locking means 50 of the sections 2, 3, on the propulsion device or on the base 9, comprise or cooperate with means 54 for controlling the unlocking of the locking means 50. For example, an opening actuator is arranged at one of the ends 6 or 7 of the propulsion wing 1, and is electrically controlled by a pulse switch 55, located at the other of the ends 6 or 7. Thus, if one of the ends 6 or 7 engages the means 38 or 39 for receiving the attachment means 8 of the propulsion wing 1, the push piece is pushed in and the opening actuator of the other end 6 or 7 can be powered; otherwise, if one of the ends 6 or 7 does not engage the means 38 or 39 for receiving the attachment means 8, the push piece is not pushed in and the pulse switch 55 is open, and the other end 6 or 7 cannot be unlocked, even accidentally.

Preferably, the two series of locking means 50 of the sections 2, 3, on the propulsion device or on the base 9, comprise or cooperate with means 56 prohibiting the simultaneous opening of the two locking means 50. These means 56 comprise, for example, a connecting rod 57 comprising through holes 58, preferably oblong, in which pins secured to the two actuators 51 engage. The length of the connecting rod and that of the oblong holes allows play corresponding to the opening of only one of the actuators 51 at a time, but not to the simultaneous opening thereof.

Irrespective of the embodiment of the propulsion wing 1, the latter preferably comprises means for controlling the incidence, the orientation, of the propulsion wing 1 relative to the wind, whether it has adopted one or the other of its deployed forms or its retracted form. The propulsion wing 1 is mounted movably relative to the moving vehicle 100 that carries it, preferably movable in all three dimensions, advantageously movable in rotation, in a plane substantially parallel to the plane X-Z, and/or in incline, in a plane substantially parallel to the plane Y-Z.

Such means for controlling the incidence have the advantage of optimizing the position of the propulsion wing 1 when the latter adopts one or the other of these deployed positions, but also of allowing free positioning thereof relative to the wind, and therefore of optimizing the propulsion of the moving vehicle 100 while limiting structural forces.

Preferably, these means for controlling the incidence are or comprise the base(s) 9, which are mounted movably relative to the propulsion vehicle, in all three dimensions, advantageously rotatably, in a plane substantially parallel to the plane X-Z, and/or in incline, in a plane substantially parallel to the plane Y-Z.

Preferably, the rotation of the base 9 is done along an axis of rotation, which follows the incline movements of the base 9 relative to the moving vehicle 100. It can therefore be substantially parallel to the axis Y or substantially oblique relative to the axis Y, depending on whether or not the base 9 is inclined relative to the upper surface of the propulsion device.

Preferably, the axis of rotation of the base 9 is located between the means 38 and 39 receiving the attachment means 8 of the ends 6 and 7 of the propulsion wing 1. Advantageously, the axis of rotation R of the base 9 is arranged offset relative to the profile of the propulsion wing, which allows the latter to stabilize itself feathered on positions where it generates less force.

When the propulsion wing 1 adopts its retracted position, the axis of rotation R of the base 9 is in the plane of symmetry between the two sections 2 and 3, offset in front of the axis formed by the means 38, 39 for receiving the attachment means 8 of the propulsion wing 1 (FIG. 11), preferably at 20 or 30% of the chord. Since the means 38, 39 are arranged on either side of the plane of symmetry between the two sections 2 and 3, this offset of the axis of rotation R toward the concave side has the advantage of improving the feathering behavior of the propulsion wing 1 in the fully deployed position.

Preferably, the means for controlling the incidence of the propulsion wing comprise or cooperate with means for unlocking the movements of the propulsion wing 1 or the base 9.

Irrespective of the embodiment of the propulsion wing 1, the latter may further comprise additional aerodynamic means, aerodynamic appendages, arranged on these sections 2, 3 and/or 4, or these ends 6, 7.

For example, the propulsion wing 1 may comprise a center board 59 (FIG. 17), preferably arranged at or on the intermediate section 4, which has the advantage of creating a diving moment, helping the propulsion wing 1 to stabilize itself either in the deployed position or in the retracted position.

The propulsion wing 1 may comprise one or several fins 60, 61, arranged at one or the other or both of its ends 6, 7.

Irrespective of the embodiment of the propulsion wing 1, the latter may further comprise suction or blowing means, allowing the aerodynamic properties to be changed.

For example, the suction or blowing means may comprise at least one fan, arranged near or inside the propulsion wing 1, the blowing or suction axis of which is parallel to the longitudinal axis of the propulsion wing 1, so as to suction air toward the inside of the propulsion wing 1 over its entire length and to expel it toward the end 6 or 7 that is not attached to the moving vehicle 100 or to the base 9, or so as to suction the air from one or several orifices located on the convex side of the propulsion wing 1 and to expel it through its orifices located on the convex side or the trailing edge, which allows modification of the lift and the drag of the aerodynamic profile, by acting in particular on the boundary layer of the flow of air on the profile, and therefore allows modification of the lift/drag curve of the propulsion wing by increasing the angle at which stalling occurs.

Irrespective of the embodiment of the propulsion wing 1, the latter may comprise or cooperate with:
- control means 900 for the means 38, 39 for receiving the attachment means 8 of the propulsion wing 1 and/or locking means 50 of the sections 2, 3, on the propulsion device or on the base 9 or bases 9, and/or
- control means 900 for the deployment or retraction of the propulsion wing 1 in one or the other of these extreme or intermediate positions, and therefore control of the articulating means 5 or the actuating assembly, and/or
- control means 900 for the means for controlling the incidence of the propulsion wing 1 relative to the direction of the wind, and/or the locking means for the movements of the propulsion wing 1 or the base 9 or bases 9, these various control means 900 preferably taking account of the force and the orientation of the wind, advantageously also the position of the moving vehicle 100 with respect to the surface on which it is moving. Advantageously, these different control means 900 are grouped together in unique control means 900.

Preferably, these control means 900 are implemented and managed by software and hardware means, conventionally a computer, preferably comprising a memory in which one or several preprogrammed procedures are stored for switching the propulsion wing 1 according to the invention.

The propulsion wing 1 according to the invention can be used for the main or backup propulsion of a land-based moving vehicle 100, for example a sandsailer or a windskate, or a maritime boat or vessel, for recreational, athletic or commercial use.

The present invention also relates to a moving vehicle 100 comprising at least one, preferably a multitude of propulsion wings 1 according to the invention.

The moving vehicle 100 is preferably a vehicle moving on land, ice or water, and can be a boat or a sailboard, a float or a skateboard

The invention claimed is:

1. A rigid propulsion wing for a moving vehicle, comprising at least one first section and one second section, a first end formed by one end of the first section and a second end formed by one end of said second section, the first end and the second end each comprising attachment means for reversibly connecting to said moving vehicle, said first section and said second section being movable with respect to each other by means of articulating means such that said rigid propulsion wing assumes, and moves from, at least a first deployed position in which said first section and said second section are arranged, substantially vertically, in an extension of each other, and in which said first end is connected to the moving vehicle by means of the attachment means of the first end, to a second deployed position, in which the first section and the second section are arranged, substantially vertically, in the extension of each other, and in which the second end is connected to the moving vehicle by means of the attachment means of the second end, and vice versa.

2. The rigid propulsion wing according to claim 1, further comprising an intermediate section, arranged between, and movable with respect to, the first section and the second section, using articulating means.

3. The rigid propulsion wing according to claim 1, wherein the first section and the second section are movable with respect to one another using articulating means so that said rigid propulsion wing assumes, and moves through, an intermediate position between the first and the second deployed position, in which said first section and the second section are arranged, substantially parallel to each other, on either side of a substantially vertical plane of symmetry, and in which the first end and the second end are both connected, reversibly, to the moving vehicle, using the attachment means thereof.

4. The rigid propulsion wing according to claim 1, wherein the first section and the second section have an asymmetrical aerodynamic profile.

5. The rigid propulsion wing according to claim 1, wherein the articulating means comprise a connecting rod engaging a movable rod of two cylinders respectively attached to the first section and the second section.

6. The rigid propulsion wing according claim 1, further comprising locking means of the articulating means.

7. The rigid propulsion wing according to claim 1, further comprising means for actuating the articulating means to set the first section and the second section in motion, the means for actuating comprising a set of pulleys on which a ballasted cable travels, each end of which is connected to a winch.

8. The rigid propulsion wing according to claim 1, further comprising at least one base, movable relative to the moving vehicle, and comprising first means and second means for respectively receiving the attachment means of the first end and the attachment means of the second end of the rigid propulsion wing.

9. The rigid propulsion wing according to claim 8, wherein the attachment means of the first end and the attachment means of the second end each comprise an attachment plate provided with two grooves, and wherein the first means and the second means for receiving the attachment means comprise two studs, attached to the base and intended to engage, and during operation, engaging, the grooves.

10. The rigid propulsion wing according to claim 1, further comprising or cooperating with first and second locking means for blocking the attachment means of the first end and the second end, respectively, said locking means each comprising a spring-loaded actuator.

11. The rigid propulsion wing according to claim 10, further comprising or cooperating with means prohibiting the simultaneous opening of the first and second locking means.

12. The rigid propulsion wing according to claim 1, further comprising a center board arranged under one section of said rigid propulsion wing, or one or several fins, arranged at the first end or the second end.

13. The rigid propulsion wing according to claim 1, further comprising or cooperating with control means of the articulating means or control means of means for controlling an incidence of the propulsion wing relative to a direction of the wind.

14. A use of the rigid propulsion wing according to claim 1 for the primary, or backup, propulsion of a moving vehicle.

15. A moving vehicle, whether maritime or land-based, comprising one or several rigid propulsion wings according to claim 1.

16. The rigid propulsion wing according to claim 2, wherein the first section, the second section, and the intermediate section are movable with respect to one another using articulating means so that said rigid propulsion wing assumes, and moves through, an intermediate position between the first and the second deployed position, in which said first section and the second section are arranged, substantially parallel to each other, on either side of a substantially vertical plane of symmetry, and in which the first end and the second end are both connected, reversibly, to the moving vehicle, using the attachment means thereof.

17. The rigid propulsion wing according to claim 2, wherein the first section, the second section, and the intermediate section have an asymmetrical aerodynamic profile.

18. The rigid propulsion wing according to claim 2, wherein the articulating means comprise a connecting rod engaging a movable rod of two cylinders respectively attached to the first section and the second section.

19. The rigid propulsion wing according claim 2, further comprising locking means of the articulating means.

20. The rigid propulsion wing according to claim 2, further comprising means for actuating the articulating means to set the first section and the second section in motion, the means for actuating comprising a set of pulleys on which a ballasted cable travels, each end of which is connected to a winch.

21. The rigid propulsion wing according to claim 2, further comprising at least one base, movable relative to the moving vehicle, and comprising first means and second means for respectively receiving the attachment means of the first end and the attachment means of the second end of the rigid propulsion wing.

22. The rigid propulsion wing according to claim 21, wherein the attachment means of the first end and the attachment means of the second end each comprise an attachment plate provided with two grooves, and wherein the first means and the second means for receiving the attachment means comprise two studs, attached to the base and intended to engage, and during operation, engaging, the grooves.

23. The rigid propulsion wing according to claim 2, further comprising or cooperating with first and second locking means for blocking the attachment means of the first end and the second end, respectively, said locking means each comprising a spring-loaded actuator.

24. The rigid propulsion wing according to claim 23, further comprising or cooperating with means prohibiting the simultaneous opening of the first and second locking means.

25. The rigid propulsion wing according to claim 2, further comprising a center board arranged under one section of said rigid propulsion wing, or one or several fins, arranged at the first end or the second end.

26. The rigid propulsion wing according to claim 2, further comprising or cooperating with control means of the articulating means or control means of means for controlling an incidence of the propulsion wing relative to a direction of the wind.

27. A use of the rigid propulsion wing according to claim 2 for the primary, or backup, propulsion of a moving vehicle.

28. A moving vehicle, whether maritime or land-based, comprising one or several rigid propulsion wings according to claim 2.

* * * * *